Jan. 19, 1937.  C. W. ORLING  2,068,036
APPARATUS FOR WEIGHING FILAMENTARY BODIES SUCH AS THREADS
Filed July 16, 1936
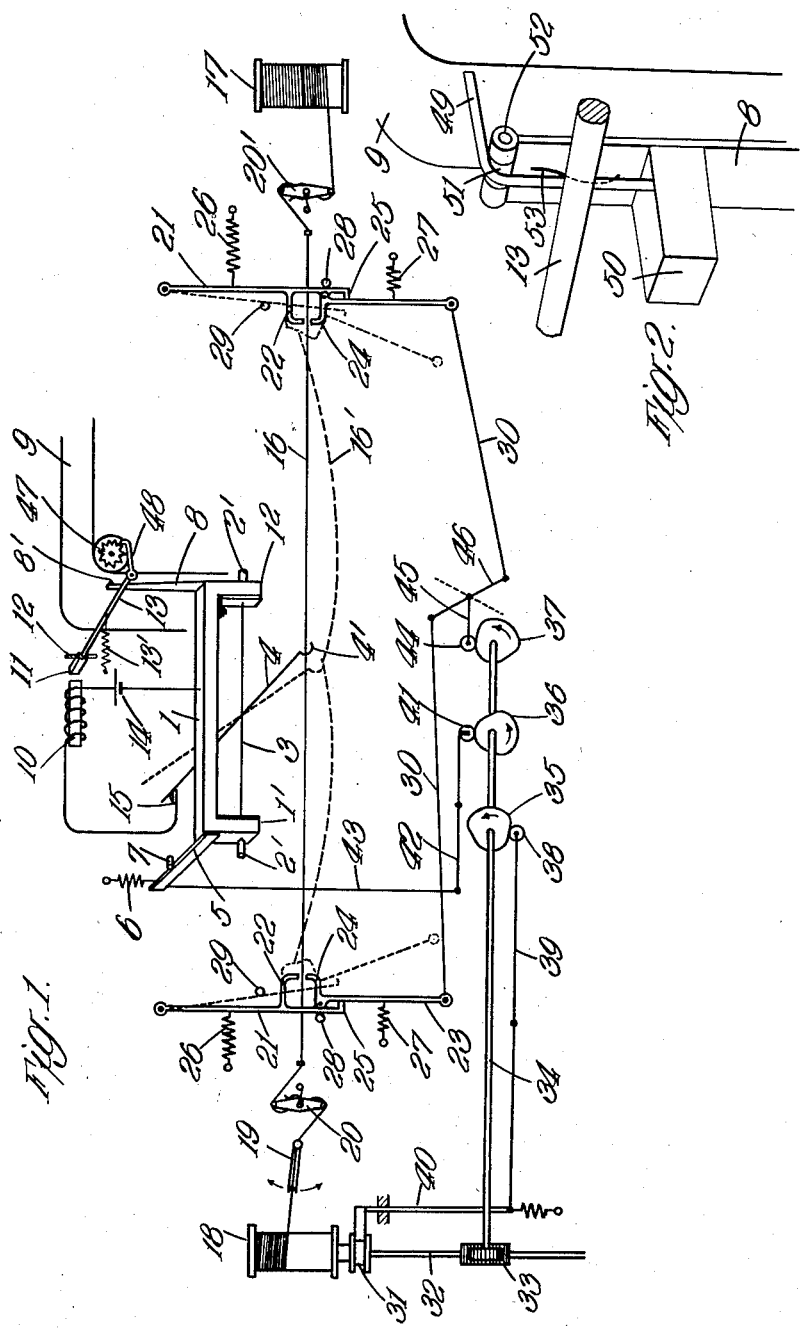
INVENTOR.
Charles William Orling
By [signature]
his ATT'Y.

Patented Jan. 19, 1937

2,068,036

UNITED STATES PATENT OFFICE 2,068,036

APPARATUS FOR WEIGHING FILAMENTARY BODIES SUCH AS THREADS

Charles William Orling, Wilmington, England

Application July 16, 1936, Serial No. 90,883
In Great Britain July 9, 1935

10 Claims. (Cl. 265—5)

This invention relates to apparatus for weighing filamentary bodies such as threads, and has for its chief object to provide an apparatus for weighing lengths of thread without the necessity of cutting such lengths out of the skein or bobbin. A further object of the invention is to provide such apparatus in automatic form whereby weight tests may be carried out from time to time during the winding of a bobbin or spool.

Accordingly, the invention consists in a sensitive torsion balance, gripping means for gripping the length of thread to be weighed and means for recording the excursion of the balance beam.

The invention also consists in apparatus as in the preceding paragraph in which the driving means driving the bobbin or spool on to which the thread is wound, drive also cam means for causing periodic operation of the gripping means and the balance to bring about automatic periodic weighings.

Recording means are associated with the balance in order to record the travel of the beam, such means preferably comprising a recording arm adapted to move with the frame of the balance and a relay, in circuit with the frame of the balance and a contact, such that restoration of the beam to normal position while under load by rotation of the frame causes the beam to complete the circuit through the contact and the armature of the relay to act upon the recording arm.

A plurality of the weighing mechanism may be mounted on a suitable framework and operated from a common drive.

The above and other objects of the invention will be apparent from the following description and the accompanying drawing which is given by way of example only and not of limitation.

In the drawing:—

Figure 1 is a diagrammatic representation of the thread weighing apparatus, while Figure 2 shows on an enlarged scale an ink syphon arranged on the end of the recording arm.

Referring now to the said drawing, the torsion balance will first be described and this comprises a frame in the form of a bar 1, the ends $1^1$, $1^2$ of which are bent at right angles and suitably pivoted between pivot pins 2, $2^1$. Between the bent ends $1^1$ of the bar 1 is stretched a torsion element 3 on which is mounted the balance beam 4, such that the axis thereof is coincident with the axis of oscillation of the frame. On the end $1^2$ of the bar 1 there is provided an arm 5 which is urged by a spring 6 to cause the frame to tend to take up its normal position in which it is held against further movement in that direction by a suitable stop 7. On the opposite end $1^2$ of the bar 1 is mounted a recording arm or blade 8, the free end $8^1$ of which is adapted to traverse a recording tape or the like 9, the free end of the arm or blade in the normal position of the frame being at one side of the tape or the like substantially as shown, so that on movement of the frame against the action of the spring 6, the free end $8^1$ of the arm or blade 8 will traverse the width of the tape 9. A relay 10 and armature 11 are disposed adjacent the recording arm or blade, the armature 11 being pivoted at 12 and provided with an extension 13 so that on actuation of the relay 10 its armature 11 will rock about its pivot 12 and cause the extension 13 to act upon the arm or blade 8 to deflect it or cause it to strike the recording tape 9. This relay 10 is connected in circuit with a suitable current source 14, for example a battery, and to a terminal on the frame and to an insulated contact 15, the balance beam 4 has at one end a hook $4^1$ to receive the thread 16 to be weighed and at its opposite end in its normal position contacts with the said contact 15. Thus, when a thread is weighed, the beam 4 is tilted into the position shown in dotted line; whereafter the frame may be rotated against the action of the spring 6 until the beam 4 is restored to its normal position, while still under load, at which point it again contacts with the contact 15 and the relay 10 operates to cause the recording arm or blade 8 to mark the tape. The angular movement of the frame is the same as the angular movement of the recording blade 8 so that its angular movement corresponds to the angle through which the beam 4 is displaced by the thread 16 being weighed, the measurement being the angular length of the return movement of the beam 4. The frame will always be rotated the same amount, but the point of contact will depend upon the angular displacement of the beam due to the weight of the thread. This displacement will normally always correspond to an excursion of the recording arm which is less than the width of the tape 9. If desired, means may be provided for damping the beam 4 in any convenient known manner.

The thread 16 is conveyed from a freely rotatable wind-off bobbin 17 to a driven take-up bobbin 18, such that during normal rotation of the take-up bobbin the thread is clear of the hook $4^1$ in the balance beam 4, as seen in full line. A suitable thread spreader 19 is disposed adjacent the take-up bobbin 18 to distribute the thread 16 thereon and a tension device 20 is positioned in front of the spreader 19.

Gripping devices are placed on opposite sides of the balance in order to grip the thread and so isolate sections thereof from the length being conveyed between the bobbins. These gripping devices preferably comprise a pivoted relatively heavy arm 21 and upper jaw 22 thereon, to which is pivoted a relatively light arm 23 having a lower jaw 24 thereon. An extension element 24 limits the movement of the arm 23 with respect to the heavier element in jaw open direction. Each of these arms is urged into jaw open position by springs 26, 27 respectively and total movement is limited by stops 28, 29. The arm 23 is attached to a wire operating element 30 which, when pulled, causes the light arm 23 to move relatively to the heavier arm 21 to cause the jaws 22, 24 on these arms to grip the thread. Further movement of the operating thread or wire 30 causes the two arms 21, 23 with the jaws 22, 24 closed on the thread, to move bodily towards the balance so that the length of thread between the two gripping means, which are identical in form, is caused to sag as a loop and rest on the hook on the balance beam as shown by the dotted line 16¹.

In order that the apparatus may work automatically a clutch 31 is provided on the shaft 32 driving the take-up bobbin 18. This shaft, through suitable gearing, for example a worm and screw 33, drives an auxiliary shaft 34, on which are mounted three cams 35, 36 and 37. The first of these cams 35 serves to operate through a cam rider 38, a pivoted clutch lever 39 which, acting through a clutch push rod 40, serves to open the clutch 31 on the bobbin driving shaft 32. The second cam 36 through a cam follower 41 acts on a lever 42, to which is connected a thread or wire 43, the other end of which is attached to the free end of the arm 5 and thus serves to rotate the balance frame bar 1 against the action of the spring 6 to restore the beam 4 to normal position through the force of torsion whilst still under load. The third cam 37 through a cam follower 44 and arm 45 serves to operate a double lever 46, to the opposite ends of which are connected wires or threads 30 actuating the thread gripping devices. The shape of the cams 35, 36, 37 and their dimensions are so chosen that on opening of the clutch 31 and consequent stopping of the take-up bobbin 18, the jaws 22, 24 of the gripping means grip the thread 16 and then move inwardly to cause the thread to sag and rest on the hook 4¹ of the beam 4. After appropriate time lag the second cam 36 comes into operation to carry out the to and fro movement of the balance frame 1. Further rotation of the cams 35, 36, 37 causes the gripping means to release the thread and the clutch to close and so resume the winding-on operation. In order that the movement of the gripper adjacent the take-up bobbin 18 shall not cause the thread to snap, there is provided the tension device 20 already referred to and, further, in order that the jolt consequent on the recommencement of the take-up shall not snap the thread adjacent the unwinding bobbin 17, a further tension device 20¹ may be provided at that point.

The recording tape 9 is preferably fed intermittently, for example, through ratchet wheel 47 and a spring urged pawl 48 mounted on the end of the extension 13 of the relay armature 11 such that on its return stroke under the influence of the spring 13¹, the pawl 48 pulls round the ratchet wheel 47 to cause the tape to advance a step forward. The recording blade or arm may take a variety of forms, for example, it may have a type mark and operate through a typewriter ribbon, its traverse from the normal position being marked on to the tape on being struck by the extension 13 of the armature 11 of the relay 10. Alternatively as shown in Figure 2, the recording blade 8 may be provided with an ink pen or syphon 49, which, during movement of the frame, will trace a line across the tape. The syphon pen 49 is in the form of a capillary tube leading from the ink-well 50 mounted on the blade 8. The pen 49 is attached to the element 51 so as to pivot about the pin 52 and is urged away from the blade 8 by a spring 53 such that when struck by the extension 13 the pen is turned about its pivot against the action of the said spring 53. At the moment of actuation of the relay the pen and, therefore, the inked line, will be deflected. Suitable datum lines may be provided on the tape. Thus, if the thread being weighed causes type marks or deflections to be recorded within the datum lines, it may be passed for a certain grade, whilst if the marks or deflections are outside the datum line the thread may be transferred to another grade. The tape 9 may be calibrated and the balance beam 4 weighted so that the mark or deflection given by the recording arm or blade will correspond to a given weight of thread.

Various modifications may be resorted to without departing from the invention, for example, instead of a purely automatic device, the mechanism may be adapted for manual operation when only occasional tests are required. It is, however, preferred to couple the operation of the clutch with the operation of the gripping means in relation to the balance frame moving means in order that the clutch may be opened and the gripping means brought into operation before the weighing operation and released only after completion of the weighing and recording of the weight.

While the length of thread weighted at each operation remains constant due to the gripping means, the amount of thread pulled through the machine between operations may be varied in a variety of ways.

I claim:—

1. In apparatus for weighing filamentary bodies such as threads, a sensitive torsion balance comprising a pivoted frame and a displaceable beam, spaced gripping means on either side of the beam for gripping the length of thread to be weighed on said beam, and a recording arm adapted to move with the frame of the balance and means including a relay, in circuit with the frame of the balance and a contact adapted to make contact with said beam, such that restoration of the beam to normal position, while under load, by rotation of the frame of the balance, causes the beam to complete the circuit through the said contact and the relay to act upon the recording arm.

2. In apparatus for weighing filamentary bodies such as threads, a sensitive torsion balance comprising a movable frame and a displeaceable beam, spaced means for isolating the length of thread to be weighed on said beam, means for rotating the balance frame, a recording arm on said balance frame adapted to mark a tape, a relay in circuit with a current source, an armature for said relay, means for rotating the balance frame to restore the displaced beam to normal position while still under load, and means with which the beam contacts during rotation of the frame to close the circuit to the relay to cause the armature thereof to act on said recording arm to make a distinguishing mark on said tape.

3. In apparatus for weighing filamentary bodies such as threads, a wind-off bobbin carrying the thread, a take-up bobbin receiving the thread, disconnectible means for driving said take-up bobbin, means operable to isolate the length of thread to be weighed, a torsion balance for weighing said isolated length of thread, said balance comprising a pivoted frame and a displaceable beam, recording means associated with the frame of said balance said frame being movable to restore the loaded beam to normal position, and means for rotating said frame in beam restoring direction, means associated with said beam and said frame to cause said recording means to record the movement of the frame necessary to restore the beam to normal position while still under load, and automatic means successively bringing about the disconnection of the said driving means from the take-up bobbin, the operation of the said isolating means and the operation of the said means for rotating the frame.

4. In apparatus for weighing filamentary bodies such as threads, a wind-off bobbin carrying the thread, a take-up bobbin for receiving the thread, disconnectible means for driving said take-up bobbin, means operable to isolate the length of thread to be weighed, a torsion balance for weighing said isolated length of thread, said balance comprising a pivoted frame and a displaceable beam, recording means associated with the frame of said balance, said frame being movable to restore the loaded beam to normal position, and means for rotating said frame in beam restoring direction, means associated with said beam and said frame to cause said recording means to record the movement of the frame necessary to restore the beam to normal position while still under load, cam elements rotated by the means for driving the said take-up bobbin, and means controlled by said cam elements for successively bringing about the disconnection of the said driving means from the take-up bobbin, the operation of the said isolating means and the operation of the said means for rotating the frame.

5. In apparatus for weighing filamentary bodies such as threads, a wind-off bobbin carrying the thread, a take-up bobbin receiving the thread, disconnectible means for driving said take-up bobbin, means operable to isolate the length of thread to be weighed, a torsion balance for weighing said isolated length of thread, said balance comprising a pivoted frame and a displaceable beam associated therewith, a recording arm associated with the frame of the balance, said frame being movable to restore the loaded and displaced beam to normal position, and means for rotating said frame in beam restoring direction, a recording tape disposed adjacent said recording arm, means on said recording arm to mark said tape, means associated with said beam and said frame to cause said recording arm to mark said tape to record the movement of the frame necessary to restore the beam to normal position while still under load, and automatic means successively bringing about the disconnection of the said driving means from the take-up bobbin, the operation of the said isolating means and the operation of the said means for rotating the frame.

6. In apparatus for weighing filamentary bodies such as threads, a wind-off bobbin carrying the thread, a take-up bobbin receiving the thread, disconnectible means for driving said take-up bobbin, means operable to isolate the length of thread to be weighed, a torsion balance for weighing said isolated length of thread, said balance comprising a pivoted frame and a displaceable beam associated therewith, a recording arm associated with the frame of the balance, said frame being movable to restore the loaded and displaced beam to normal position, and means for rotating said frame in beam restoring direction, a recording tape disposed adjacent said recording arm, means on said recording arm to mark said tape, means associated with said beam and said frame to cause said recording arm to mark said tape to record the movement of the frame necessary to restore the beam to normal position while still under load, cam elements rotated by the said means for driving the take-up bobbin, and means controlled by said cam elements for successively bringing about the disconnection of the said driving means from the take-up bobbin, the operation of the said isolating means and the operation of the said means for rotating the frame.

7. In apparatus for weighing filamentary bodies such as threads, a wind-off bobbin carrying the thread, a take-up bobbin receiving the thread, disconnectible means for driving said take-up bobbin, means operable to isolate the length of thread to be weighed, a torsion balance for weighing said isolated length of thread, said balance comprising, a pivoted frame and a displaceable beam associated therewith, a recording arm associated with the frame of the balance, said frame being movable to restore the loaded and displaced beam to normal position, and means for rotating said frame in beam restoring direction, a recording tape disposed adjacent said recording arm, means on said recording arm to mark said tape, a relay in a circuit adapted to be closed by said beam in normal position, said relay comprising an armature means associated with the armature of said relay to cause said recording arm to mark said tape to record the movement of the frame necessary to restore the beam to normal position while still under load, and automatic means successively bringing about the disconnection of the said driving means from the take-up bobbin, the operation of the said isolating means and the operation of the said means for rotating the frame.

8. In apparatus for weighing filamentary bodies such as threads, a wind-off bobbin carrying the thread, a take-up bobbin receiving the thread, disconnectible means for driving said take-up bobbin, means operable to isolate the length of thread to be weighed, a torsion balance for weighing said isolated length of thread, said balance comprising a pivoted frame and a displaceable beam associated therewith, a recording arm associated with the frame of the balance, said frame being movable to restore the loaded and displaced beam to normal position, and means for rotating said frame in beam restoring direction, a recording tape disposed adjacent said recording arm, means on said recording arm to mark said tape, a relay in a circuit adapted to be closed by said beam in normal position said relay comprising an armature, means associated with the armature of said relay to cause said recording arm to mark said tape to record the movement of the frame necessary to restore the beam to normal position while still under load, automatic means successively bringing about the disconnection of the said driving means from the take-up bobbin, the operation of the said isolating means and the operation of the said means for rotating the frame, and means connected with the armature of the relay for advancing the tape.

9. In apparatus for weighing filamentary bodies such as threads, a wind-off bobbin carrying the thread, a take-up bobbin receiving the thread, disconnectible means for driving said take-up bobbin, means operable to isolate the length of thread to be weighed, a torsion balance for weighing said isolated length of thread, said balance comprising a pivoted frame and a displaceable beam associated therewith, a recording arm associated with the frame of the balance, said frame being movable to restore the loaded and displaced beam to normal position, and means for rotating said frame in beam restoring direction, a recording tape disposed adjacent said recording arm, means on said recording arm to mark said tape, a relay in a circuit adapted to be closed by said beam in normal position, said relay including an armature means associated with the armature of said relay to cause said recording arm to mark said tape to record the movement of the frame necessary to restore the beam to normal position while still under load, cam elements rotated by the said means for driving the take-up bobbin, and means controlled by said cam elements for successively bringing about the disconnection of the said driving means from the take-up bobbin, the operation of the said isolating means and the operation of the said means for rotating the frame.

10. In apparatus for weighing filamentary bodies such as threads, a wind-off bobbin carrying the thread, a take-up bobbin receiving the thread, disconnectible means for driving said take-up bobbin, means operable to isolate the length of thread to be weighed, a torsion balance for weighing said isolated length of thread, said balance comprising a pivoted frame and a displaceable beam associated therewith, a recording arm associated with the frame of the balance, said frame being movable to restore the loaded and displaced beam to normal position, and means for rotating said frame in beam restoring direction, a recording tape disposed adjacent said recording arm, means on said recording arm to mark said tape, a relay in a circuit adapted to be closed by said beam in normal position, said relay including an armature, means associated with the armature of said relay to cause said recording arm to mark said tape to record the movement of the frame necessary to restore the beam to normal position while still under load, cam elements rotated by the means for driving the take-up bobbin, means controlled by said cam elements for successively bringing about the disconnection of the said driving means from the take-up bobbin, the operation of the said isolating means and the operation of the said means for rotating the frame, and means connected with the armature of the said relay for advancing the tape.

CHARLES WILLIAM ORLING.